(12) United States Patent
Cai et al.

(10) Patent No.: US 12,047,423 B2
(45) Date of Patent: Jul. 23, 2024

(54) NETWORK SLICING MANAGEMENT FOR THE IP MULTIMEDIA SUBSYSTEM (IMS) DOMAIN

(71) Applicant: Nokia Solutions and Networks Oy, Espoo (FI)

(72) Inventors: Yigang Cai, Naperville, IL (US); Laurence Wang, Qingdao (CN)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 16/982,970

(22) PCT Filed: Mar. 20, 2018

(86) PCT No.: PCT/EP2018/057046
§ 371 (c)(1),
(2) Date: Sep. 21, 2020

(87) PCT Pub. No.: WO2019/179607
PCT Pub. Date: Sep. 26, 2019

(65) Prior Publication Data
US 2021/0021647 A1    Jan. 21, 2021

(51) Int. Cl.
*H04L 65/1016* (2022.01)
*H04L 65/1023* (2022.01)
(Continued)

(52) U.S. Cl.
CPC ...... *H04L 65/1016* (2013.01); *H04L 65/1026* (2013.01); *H04L 65/1036* (2013.01); *H04L 65/1104* (2022.05)

(58) Field of Classification Search
CPC . H04L 41/0803; H04L 43/08; H04L 67/1029; H04L 69/32; H04L 45/64; H04L 41/04; H04L 43/00; H04L 45/306; H04L 65/1016; H04L 29/06217; H04M 15/57; H04M 2215/208
See application file for complete search history.

(56) References Cited

U.S. PATENT DOCUMENTS 9,961,713 B2 * 5/2018 Salkintzis ............ H04W 84/00
9,967,801 B2 * 5/2018 Byun ................... H04W 60/00
(Continued)

OTHER PUBLICATIONS

Chinese Office Action mailed in corresponding CN201880091488.X dated Oct. 21, 2021, 7 pages.
(Continued)

*Primary Examiner* — Aftab N. Khan
(74) *Attorney, Agent, or Firm* — Tong, Rea, Bentley & Kim, LLC (57) ABSTRACT

Systems, methods, and software for selecting among a plurality of IMS network slices. When an IP Multimedia Subsystem (IMS) network is partitioned into a plurality of IMS network slices, an IMS slice selection manager may be implemented at an edge of the IMS network slices. The IMS slice selection manager receives an IMS slice selection policy, and receives an IMS service request for an IMS service. The IMS slice selection manager selects an IMS network slice to provide the IMS service based on the IMS slice selection policy, and causes routing of the IMS service request to the selected IMS network slice.

15 Claims, 8 Drawing Sheets

(51) Int. Cl.
*H04L 65/1033* (2022.01)
*H04L 65/1104* (2022.01)

(56) References Cited

U.S. PATENT DOCUMENTS

| | | | |
|---|---|---|---|
| 10,070,344 B1* | 9/2018 | Dowlatkhah | H04W 28/16 |
| 10,235,226 B1* | 3/2019 | Shekhar | H04L 45/60 |
| 10,797,934 B1* | 10/2020 | Akman | H04L 41/0803 |
| 2004/0179526 A1* | 9/2004 | Cypher | G06F 15/17381 |
| | | | 370/392 |
| 2016/0353465 A1* | 12/2016 | Vrzic | H04W 28/0221 |
| 2017/0070892 A1 | 3/2017 | Song et al. | |
| 2017/0142591 A1* | 5/2017 | Vrzic | H04W 24/02 |
| 2017/0289791 A1* | 10/2017 | Yoo | H04W 68/005 |
| 2017/0331785 A1* | 11/2017 | Xu | H04W 76/11 |
| 2018/0176858 A1* | 6/2018 | Wang | H04W 48/18 |
| 2018/0324576 A1* | 11/2018 | Salkintzis | H04W 12/06 |
| 2019/0053147 A1* | 2/2019 | Qiao | H04M 15/8038 |
| 2019/0140933 A1* | 5/2019 | Guim Bernat | H04L 47/2425 |
| 2020/0059856 A1* | 2/2020 | Cui | H04W 24/02 |
| 2020/0120721 A1* | 4/2020 | Lau | H04W 76/11 |
| 2020/0259786 A1* | 8/2020 | Saarinen | H04L 61/30 |
| 2021/0029618 A1* | 1/2021 | Jain | H04W 48/16 |
| 2021/0036919 A1* | 2/2021 | Foti | H04L 65/1016 |

OTHER PUBLICATIONS

Chinese Office Action dated Feb. 1, 2023 in corresponding CN Application No. 201880091488.X, 6 pages.

Moreira, et al., "An Adaptable Storage Algorithm for Content Delivery Networks," 2015 IFIP/IEEE International Symposium on Integrated Network Management (IM), May 11, 2015, Ottawa, Canada, 7 pages.

3GPP, "3rd Generation Partnership Project; Technical Specification Group Services and System Aspects; System Architecture for the 5G System (Release 15)", TR 23.501, version 1.5.0, Nov. 13, 2017.

3GPP, "3rd Generation Partnership Project; Technical Specification Group Services and System Aspects; Feasibility Study on New Services and Markets Technology Enablers (Release 14)", TR 22.891, version 14.2.0, Sep. 30, 2016.

* cited by examiner

NETWORK SLICING MANAGEMENT FOR THE IP MULTIMEDIA SUBSYSTEM (IMS) DOMAIN

CROSS-REFERENCE TO RELATED APPLICATIONS

The present application is a 371 application of PCT Patent Application Serial No. PCT/EP2018/057046, entitled "NETWORK SLICING MANAGEMENT FOR THE IP MULTIMEDIA SUBSYSTEM (IMS) DOMAIN", and filed on Mar. 20, 2018, the entirety of which is incorporated by reference herein.

TECHNICAL FIELD

This disclosure relates to the field of communication systems and, in particular, to next generation networks.

BACKGROUND

Next generation networks, such as Fifth Generation (5G), denote the next major phase of mobile telecommunications standards beyond the current Fourth Generation (4G) standards. In comparison to 4G networks, next generation networks may be enhanced in terms of radio access and network architecture. Next generation networks intend to utilize new regions of the radio spectrum for Radio Access Networks (RANs), such as centimeter and millimeter wave bands. Also, the architecture of next generation networks has the functional elements of the user plane separated from the control plane. With Software-Defined Networking (SDN) and Network Functions Virtualization (NFV) supporting an underlying physical architecture, functional elements may be defined on the physical architecture to provide network functions. It is envisioned that next generation networks will utilize the concept to network slicing, where a physical network is partitioned into multiple virtual networks that offer optimal support for different types of services. Because the concept of network slicing for next generation networks is still in a research stage, it may be desirable to identify effective ways of managing network slicing.

SUMMARY

Embodiments described herein are directed to network slicing in the IP Multimedia Subsystem (IMS) domain. The IMS domain is an architectural framework for delivering IP multimedia services, such as High-Definition (HD) voice (VoIP or VoLTE), Wi-Fi calling, enriched messaging (e.g., instant messaging), enriched calling with pre-call information, video calling, HD video conferencing, Video on Demand (VoD), web communication, etc. A plurality of IMS network slices may be defined to provide IMS services. The embodiments describe ways to select an IMS network slice for a requested IMS service in a next generation network. One technical benefit of IMS slice selection as described herein is that an IMS network slice may be selected for an IMS service that is best suited to provide the IMS service.

One embodiment comprises a system that includes an IMS slice selection manager implemented at an edge of a plurality of IMS network slices of an IMS network. The IMS slice selection manager comprises a policy controller and an IMS slice selector. The policy controller is configured to receive an IMS slice selection policy. The IMS slice selector is configured to receive an IMS service request for an IMS service, to select an IMS network slice from the plurality of IMS network slices to provide the IMS service based on the IMS slice selection policy, and to initiate routing of the IMS service request to the IMS network slice selected to provide the IMS service.

In another embodiment, the IMS slice selection manager is implemented at a session border controller.

In another embodiment, the IMS slice selector is configured to provide an identifier for the IMS network slice selected to provide the IMS service to a Network Slice Selection Function (NSSF) of a control plane of a next generation network.

In another embodiment, the IMS slice selection manager comprises an interface component configured to directly communicate with the NSSF over a reference point.

In another embodiment, the system further comprises an IMS policy manager configured to monitor for a change in network conditions, to modify at least one of the IMS network slices based on the change to the network conditions, to modify the IMS slice selection policy based on modification of the at least one of the IMS network slices, and to provide the IMS slice selection policy to the IMS slice selection manager.

In another embodiment, the IMS policy manager is configured to interact with a management and organization element to modify the at least one of the IMS network slices.

In another embodiment, the IMS policy manager is implemented in a Policy Control Function of a control plane of a next generation network.

Another embodiment comprises a method of performing IMS slice selection. The method comprises receiving an IMS slice selection policy at an IMS slice selection manager, receiving an IMS service request for an IMS service, selecting an IMS network slice from the plurality of IMS network slices to provide the IMS service based on the IMS slice selection policy, and initiating routing of the IMS service request to the IMS network slice selected to provide the IMS service.

In another embodiment, the method further comprises providing an identifier for the IMS network slice selected to provide the IMS service to a Network Slice Selection Function (NSSF) of a control plane of a next generation network.

In another embodiment, the method further comprises monitoring, at an IMS policy manager, for a change in network conditions, modifying at least one of the IMS network slices based on the change to the network conditions, modifying the IMS slice selection policy at the IMS policy manager based on modification of the at least one of the IMS network slices, and providing the IMS slice selection policy to the IMS slice selection manager.

Another embodiment comprises a non-transitory computer readable medium embodying programmed instructions executed by one or more processors, wherein the instructions direct the processors to implement an IMS slice selection manager at an edge of a plurality of IMS network slices of an IMS network. The IMS slice selection manager is configured to receive an IMS slice selection policy, receive an IMS service request for an IMS service, select an IMS network slice from the plurality of IMS network slices to provide the IMS service based on the IMS slice selection policy, and initiate routing of the IMS service request to the IMS network slice selected to provide the IMS service.

Another embodiment comprises a manager implemented at an edge of a plurality of IMS network slices of an IMS network. The manager comprises a means for receiving an IMS slice selection policy. The manager comprises a means for receiving an IMS service request for an IMS service, a means for selecting an IMS network slice from the plurality of IMS network slices to provide the IMS service based on the IMS slice selection policy, and a means for initiating routing of the IMS service request to the IMS network slice selected to provide the IMS service.

The above summary provides a basic understanding of some aspects of the specification. This summary is not an extensive overview of the specification. It is intended to neither identify key or critical elements of the specification nor delineate any scope of the particular embodiments of the specification, or any scope of the claims. Its sole purpose is to present some concepts of the specification in a simplified form as a prelude to the more detailed description that is presented later.

DESCRIPTION OF THE DRAWINGS

Some embodiments of the invention are now described, by way of example only, and with reference to the accompanying drawings. The same reference number represents the same element or the same type of element on all drawings.

DESCRIPTION OF EMBODIMENTS

The figures and the following description illustrate specific exemplary embodiments. It will thus be appreciated that those skilled in the art will be able to devise various arrangements that, although not explicitly described or shown herein, embody the principles of the embodiments and are included within the scope of the embodiments. Furthermore, any examples described herein are intended to aid in understanding the principles of the embodiments, and are to be construed as being without limitation to such specifically recited examples and conditions. As a result, the inventive concept(s) is not limited to the specific embodiments or examples described below, but by the claims and their equivalents.

Figure 1:
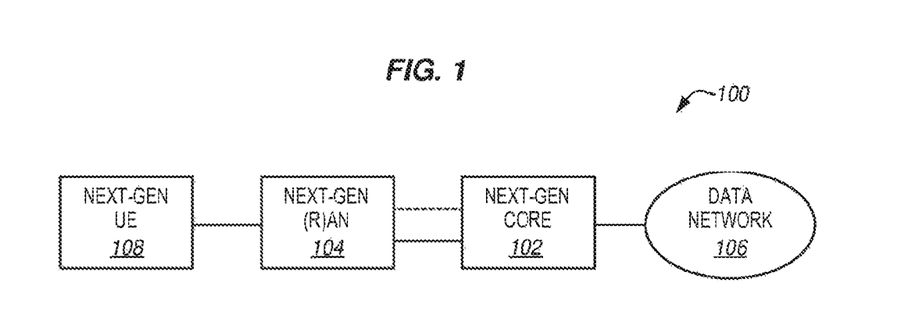
FIG. 1 illustrates a high-level architecture of a next generation mobile network.

FIG. 1 illustrates a high-level architecture of a next generation network 100 as described in the Third Generation Partnership Project (3GPP) TR 23.799 (v14.0.0), which is incorporated by reference as if fully included herein. Next generation network 100 includes a next generation (Next-Gen) core network 102, and a next generation access network and/or radio access network ((R)AN) 104. (R)AN 104 may support Evolved-UMTS Terrestrial Radio Access Network (E-UTRAN) access, Wireless Local Area Network (WLAN) access, fixed access, satellite radio access, new Radio Access Technologies (RAT), etc. Core network 102 interconnects (R)AN 104 with a data network (DN) 106. Data network 106 may be an operator external public or private data network, or an intra-operator data network (e.g., for IMS services). Next generation User Equipment (UE) 108 is configured to attach to (R)AN 104 to access services from core network 102.

Figure 2:
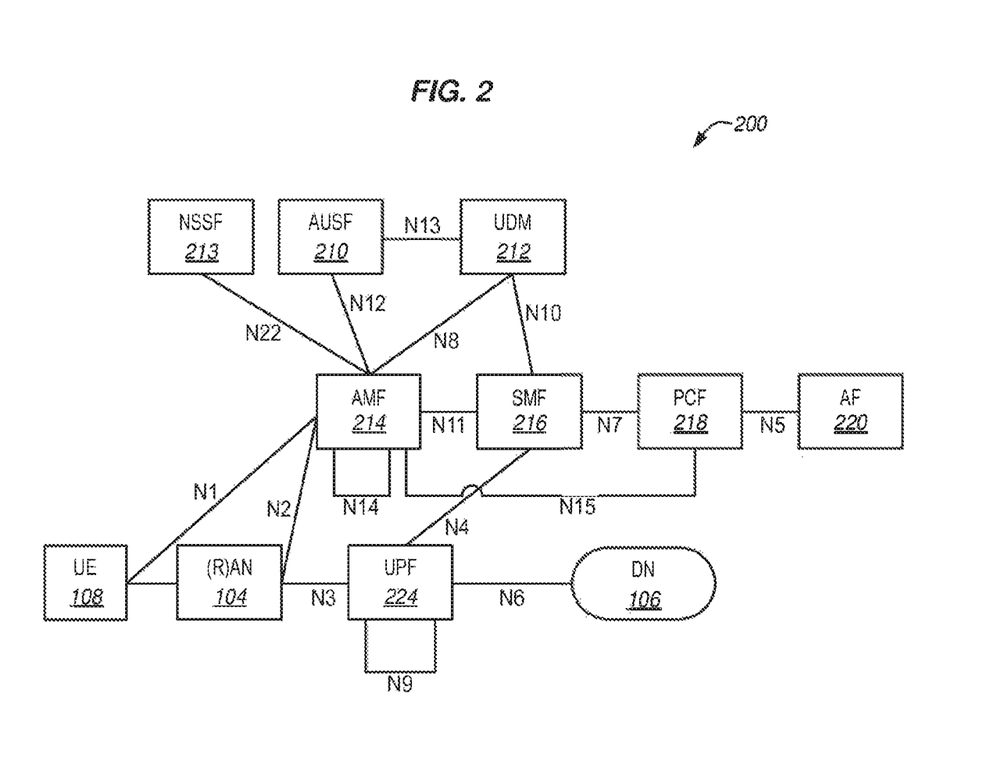
FIG. 2 illustrates a non-roaming architecture of a next generation network.

FIG. 2 illustrates a non-roaming architecture 200 of a next generation network. The architecture in FIG. 2 is a reference point representation, as is further described in 3GPP TS 23.501 (v1.5.0), which is incorporated by reference as if fully included herein. Architecture 200 is comprised of Network Functions (NF) for core network 102, which may be implemented either as a network element on dedicated hardware, as a software instance running on dedicated hardware, or as a virtualized function instantiated on an appropriate platform (e.g., a cloud infrastructure). The network functions for the control plane are separated from the user plane. The control plane of core network 102 includes an Authentication Server Function (AUSF) 210, a Unified Data Management (UDM) 212, a Network Slice Selection Function (NSSF) 213, an Access and Mobility Management Function (AMF) 214, a Session Management Function (SMF) 216, a Policy Control Function (PCF) 218, and an Application Function (AF) 220. The user plane of core network 102 includes one or more User Plane Functions (UPF) 224 that communicate with data network (DN) 106. A UE 108 is able to access the control plane and the user plane of core network 102 through (R)AN 104.

AUSF 210 is configured to support authentication of UE 108. UDM 212 is configured to store subscription data/information for UE 108. UDM 212 may store three types of user data: subscription, policy, and session-related context (e.g., UE location). AMF 214 is configured to provide UE-based authentication, authorization, mobility management, etc. SMF 216 is configured to provide the following functionality: session management (SM), UE Internet Protocol (IP) address allocation and management, selection and control of UPF(s), termination of interfaces towards PCF 218, control part of policy enforcement and Quality of Service (QoS), lawful intercept, termination of SM parts of NAS messages, Downlink Data Notification (DNN), roaming functionality, handle local enforcement to apply QoS for Service Level Agreements (SLAs), charging data collection and charging interface, etc. If UE 108 has multiple sessions, different SMFs may be allocated to each session to manage them individually and possibly provide different functionalities per session. PCF 218 is configured to support a unified policy framework to govern network behavior, and to provide policy rules to control plane functions for QoS enforcement, charging, access control, traffic routing, etc. AF 220 provides information on a packet flow to PCF 218. Based on the information, PCF 218 is configured to determine policy rules about mobility and session management to make AMF 214 and SMF 216 operate properly.

UPF 224 supports various user plane operations and functionalities, such as packet routing and forwarding, traffic handling (e.g., QoS enforcement), an anchor point for Intra-RAT/Inter-RAT mobility (when applicable), packet inspection and policy rule enforcement, lawful intercept (UP collection), traffic accounting and reporting, etc. Data network 106 is not part of core network 102, and provides Internet access, operator services, 3rd party services, etc. For instance, the International Telecommunication Union (ITU)

has classified 5G mobile network services into three categories: Enhanced Mobile Broadband (eMBB), Ultra-reliable and Low-Latency Communications (uRLLC), and Massive Machine Type Communications (mMTC) or Massive Internet of Things (MIoT). eMBB focuses on services that have high bandwidth requirements, such as HD videos, Virtual Reality (VR), and Augmented Reality (AR). uRLLC focuses on latency-sensitive services, such as automated driving and remote management. mMTC and MIoT focuses on services that include high requirements for connection density, such as smart city and smart agriculture. Data network 106 may be configured to provide these and other services.

Architecture 200 includes the following reference points. The N1 reference point is implemented between UE 108 and AMF 214. The N2 reference point is implemented between (R)AN 104 and AMF 214. The N3 reference point is implemented between (R)AN 104 and UPF 224. The N4 reference point is implemented between the SMF 216 and UPF 224. The N5 reference point is implemented between PCF 218 and AF 220. The N6 reference point is implemented between UPF 224 and data network 106. The N7 reference point is implemented between the SMF 216 and PCF 218. The N8 reference point is implemented between UDM 212 and AMF 214. The N9 reference point is implemented between two UPFs 224. The N10 reference point is implemented between UDM 212 and SMF 216. The N11 reference point is implemented between AMF 214 and SMF 216. The N12 reference point is implemented between AMF 214 and AUSF 210. The N13 reference point is implemented between UDM 212 and AUSF 210. The N14 reference point is implemented between two AMFs. The N15 reference point is implemented between PCF 218 and AMF 214 in the case of a non-roaming scenario. The N22 reference point is implemented between NSSF 213 and AMF 214.

One goal of next generation networks (e.g., 5G) is to enable network slicing for core network 102. With network slicing, a physical network may be partitioned into multiple virtual instances so that a mobile operator can offer support for different types of services for different types of customer segments. A network slice is a logical representation of network functions and corresponding resource requirements necessary to provide the required services and network capabilities. For example, a network slice may be comprised of control plane network functions (CP NF) and user plane network functions (UP NF) that are optimized for a variety of characteristics, such as latency, bandwidth, etc.

Figure 3:
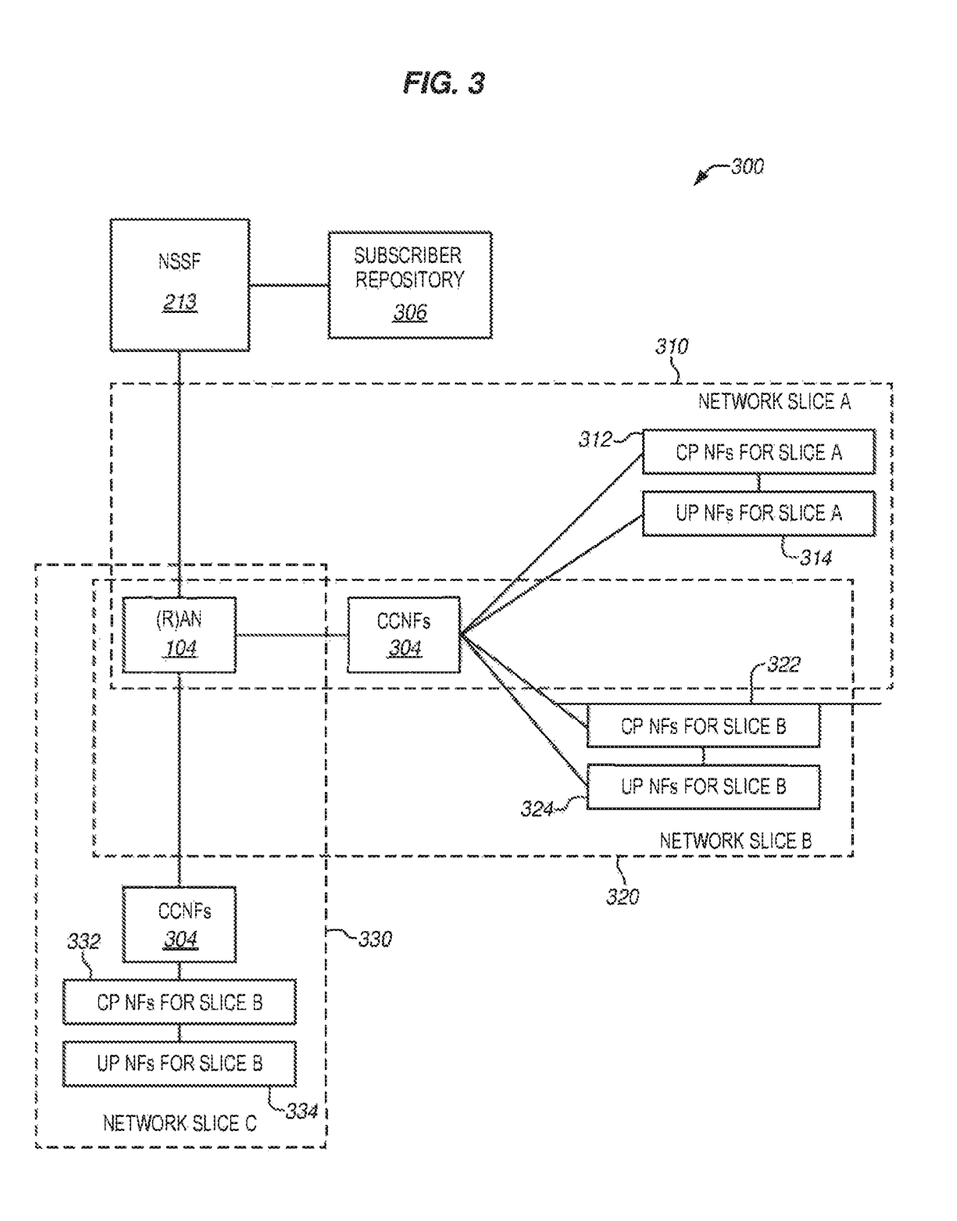
FIG. 3 illustrates a network slicing architecture.

FIG. 3 illustrates a network slicing architecture 300, as is further described in 3GPP TR 23.799. In this architecture, the control plane of core network 102 (see FIG. 1) is partitioned into three types of Network Functions (NFs). One type of network function is NSSF 213. NSSF 213 handles an initial attach request and session establishment request from UE 108 by selecting an appropriate network slice for UE 108 based on subscription information, UE usage type, service type, and UE capabilities. NSSF 213 connects with a subscriber repository 306 (e.g., Home Subscriber Server (HSS) and/or Subscriber Profile Repository (SPR)), which is a database or databases that stores subscriber-related information or subscriber profiles. Another type of network function is a Common Control Plane Network Function (CCNF) 304. CCNF 304 is the control plane entry function that is shared among different network slices, and includes the Mobility Management (MM) function, the authentication (AU) function, and the NAS Proxy function. Other types of network functions are Slice-Specific Control Plane Network Functions (CP NF) and Slice-Specific User Plane Network Functions (UP NF). Slice-specific network functions are allocated to a particular network slice (i.e., not shared among network slices), and have no direct interface with (R)AN 104. The network functions that are allocated to a particular network slice are configured to support a particular set of functionalities, such as session management and QoS framework.

In FIG. 3, core network 102 is partitioned into three network slices: network slice A 310, network slice B 320, and network slice C 330. Slice-specific control plane network functions (CP NFs) 312 are allocated to network slice A 310 for core network 102, slice-specific control plane network functions 322 are allocated to network slice B 320 for core network 102, and slice-specific control plane network functions 332 are allocated to network slice C 330 for core network 102. Slice-specific user plane network functions (UP NFs) 314 are allocated to network slice A 310, slice-specific user plane network functions 324 are allocated to network slice B 320, and slice-specific user plane network functions 334 are allocated to network slice C 330. Each network slice 310, 320, and 330 is associated with a network slice ID (e.g., NeS-ID or slice instance ID).

As described above, data network 106 is not a part of core network 102 that is subject to slicing as described above. Data network 106 represents a service or application layer that provides services to UE 108. Some of the services provided by data network 106 may include IMS services. IP Multimedia Subsystem (IMS) is a network solution that delivers rich real-time communication or telecommunication services for both consumer and business users over any access network and for any device types, including smartphones, tablets, wearables, laptops, and fixed phones. Examples of IMS communication services are HD voice, Wi-Fi calling, enriched messaging, enriched calling with pre-call information, video calling, HD video conferencing, VoD, web communication, etc. IMS provides one common system for IP-based communication services.

Figure 4:
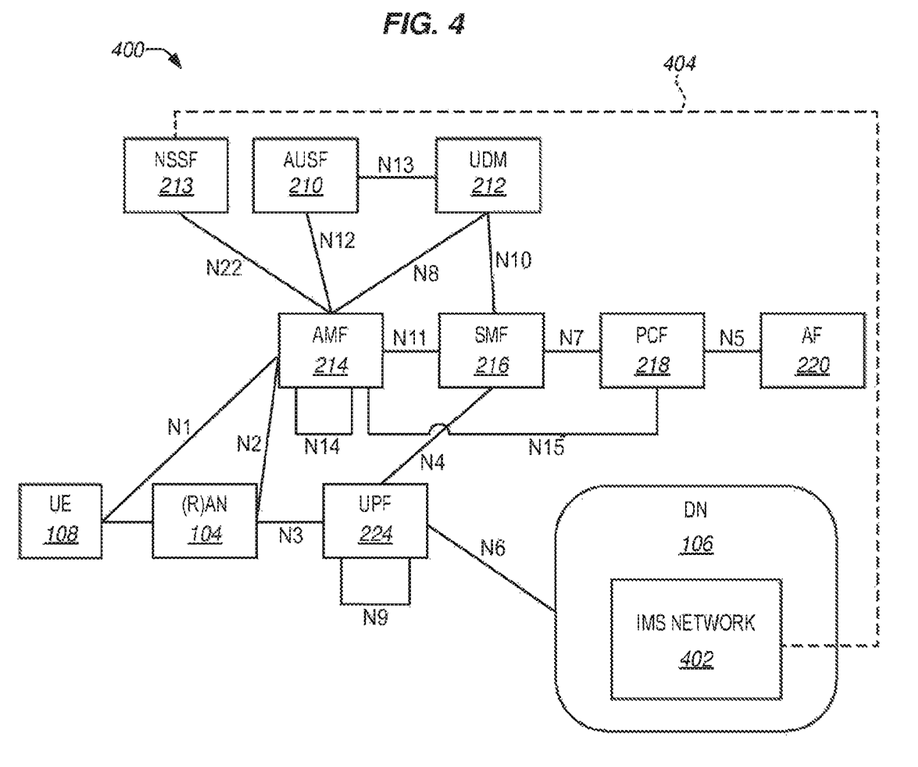
FIG. 4 illustrates a non-roaming architecture of a next generation network in an illustrative embodiment.

FIG. 4 illustrates a non-roaming architecture 400 of a next generation network in an illustrative embodiment. Architecture 400 is similar to architecture 200 shown in FIG. 2, and further illustrates an IMS network 402 as part of data network 106. IMS network 402 is configured to provide IMS services to UEs, such as UE 108. One or more elements of IMS network 402 may be communicatively coupled to NSSF 213. An element of IMS network 402 may communicate with NSSF 213 directly over an interface or reference point 404, which is newly-defined herein. An element of IMS network 402 may communicate with NSSF 213 through the core network, such as through AMF 214.

Figure 5:
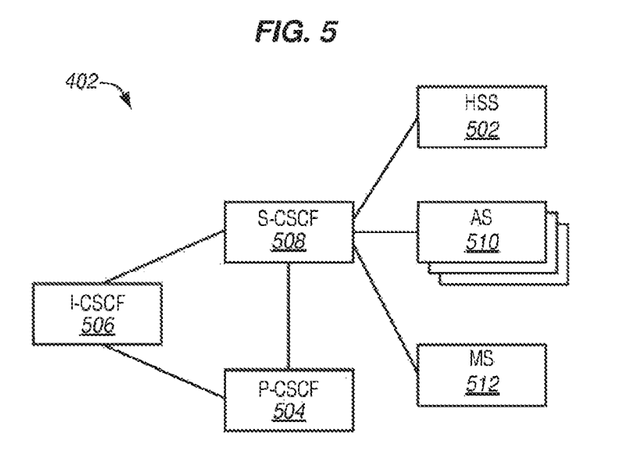
FIG. 5 illustrates an IMS network in an illustrative embodiment.

FIG. 5 illustrates IMS network 402 in an illustrative embodiment. IMS network 402 is a collection of different functions that are linked by standardized interfaces. For example, IMS network 402 includes a Home Subscriber Server (HSS) 502, a Proxy-Call Session Control Function (P-CSCF) 504, an Interrogating-CSCF (I-CSCF) 506, and a Serving-CSCF (S-CSCF) 508 of a control layer (or control plane). IMS network 402 also includes Application Servers (AS) 510 and Media Servers (MS) 512 of an application layer (or user plane). The entities of the control layer handle the signaling messages (e.g., Session Initiation Protocol (SIP)) to support a session. For example, HSS 502 is a database that stores subscription-related information or subscriber profiles for users of IMS terminals (also referred to as UE or IMS UE). A P-CSCF 504 is a SIP proxy that is the first point of contact for an IMS terminal. The P-CSCF 504 is assigned to an IMS terminal before registration, and sits on the signaling path to inspect the signaling messages. I-CSCF 506 queries HSS 502 for an address of the S-CSCF 508, and forwards requests/responses to the S-CSCF 508. S-CSCF 508 is the central node of the signaling plane. S-CSCF 508 has knowledge of the services subscribed to by the users, and is responsible for enabling the services by contacting the appropriate application server 510. The entities of the application layer process data, store data, and provide services for IMS terminals. Application server 510 is part of the service/application plane, and hosts and executes IMS-specific services, such as IP telephony and multimedia services. IMS is intended to be access independent, which means that the service delivery is implemented regardless of the device and the access medium, so the UEs and the access network are not shown in FIG. 5.

IMS services may be considered as part of the services available in next generation networks. Considering the rich real-time communication services for both consumer and business users that are provided by an IMS network, being able to deliver the wide variety of network performance characteristics that future services will demand is one of the primary technical challenges faced by an IMS service provider. The performance requirements placed on the network will demand connectivity in terms of data rate, latency, QoS, security, availability, and many other parameters; all of which may vary from one service to another. For example, enriched messaging may have different QoS requirements than video calling, and web communication may have different QoS requirements than HD voice (VoLTE). IMS services may be provided by virtual network functions implemented on a common physical network. Thus, an IMS network (e.g., IMS network 402) may be partitioned into IMS network slices to provide different services, handle different service characteristics or use cases, etc. Network slicing solutions for IMS has not been considered as part of 5G network slicing studies, as IMS network slicing presents different concepts and values than regular 5G network slicing.

Figure 6:
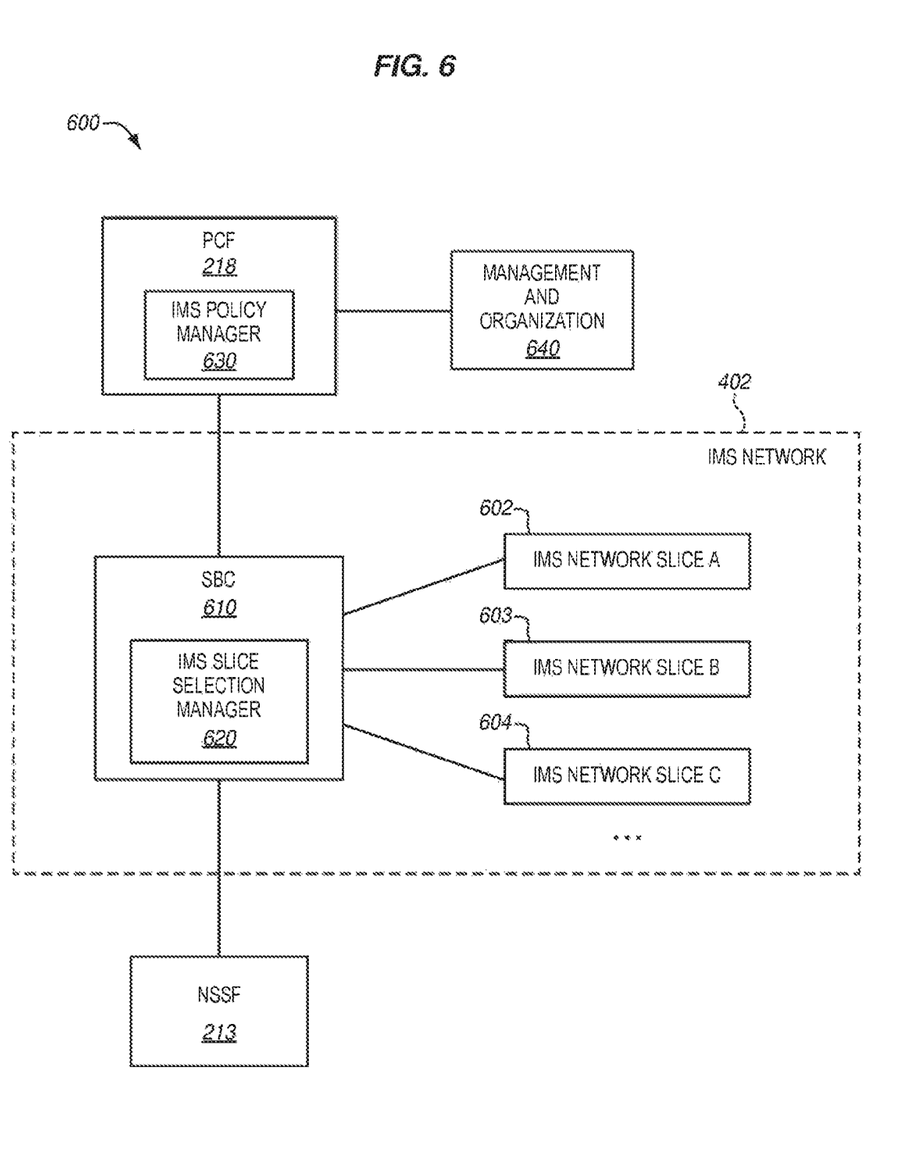
FIG. 6 illustrates a system that implements IMS network slicing in an illustrative embodiment.

FIG. 6 illustrates a system 600 that implements IMS network slicing in an illustrative embodiment. In system 600, IMS network 402 is partitioned into a plurality of IMS network slices, such as IMS network slice A 602, IMS network slice B 603, and IMS network slice C 604. Each IMS network slice 602-604 may include one or more virtual network functions that are optimized to support and perform one or more services. For example, each IMS network slice may include an I-CSCF, an S-CSCF, one or more application servers, etc. One IMS network slice may be optimized for HD voice, while another IMS network slice may be optimized for enriched messaging. One IMS network slice may be optimized for HD video conferencing, while another IMS network slice may be optimized for web communication.

System 600 further includes a Session Border Controller (SBC) 610. SBC 610 is deployed at the network edge of IMS network 402 (i.e., the edge of IMS network slices 602-604), and is the entry point into IMS network 402 from a core of a next generation network. An SBC gives service providers an economical and reliable means to secure and control media and signaling streams that cross the edges of an IMS network. The SBC may sit at the edge of access networks to secure any type of IP access, and deliver IMS services. The SBC may also sit at the edge of peer networks to support roaming, IMS interconnection, or corporate SIP trunking scenarios.

For example, SBC 610 may be the entry point into IMS network 402 from a UPF 224 of the 5G core network (see FIG. 2). SBC 610 is configured to secure IMS network 402 while providing interworking between incompatible signaling messages and media flows (sessions) from end devices or application servers. SBC 610 may be a Back-to-Back User Agent (B2BUA) that exchanges signaling messages (e.g., SIP) with a network function in the core network so that IMS network 402 is isolated from network functions that access IMS services. SBC 610 may incorporate functions of a P-CSCF of IMS network 402. In this embodiment, an IMS slice selection manager 620 may be implemented at the edge of IMS network slices 602-604. IMS slice selection manager 620 is shown as being implemented at SBC 610, but may be separate from SBC 610 in other embodiments. Implementing IMS slice selection manager 620 on SBC 610 may be advantageous as it enables IMS slice selection manager 620 to take advantage of existing interfaces to both UEs and IMS network 402. IMS slice selection manager 620 is configured to manage how IMS network slices 602-604 are selected for a UE or IMS terminal, for a session involving a UE or IMS terminal, etc. For example, when a request is received for an IMS service, IMS slice selection manager 620 may be configured to select an IMS network slice 602-604 that is optimized to provide the IMS service.

System 600 may also include an IMS policy manager 630. IMS policy manager 630 may be implemented in a PCF 218 of a next generation network as illustrated in FIG. 6. IMS policy manager 630 may be configured to generate or formulate an IMS slice selection policy based on local provisioning and/or input from other network functions, such as PCF 218, UDM 212, a charging system, etc.

System 600 may further include a management and organization (MANO) element 640. Management and organization element 640 is configured to control NFV to create new IMS network slices, to release or tear down an existing IMS network slice, to scale-up or scale-out an IMS network slice, to scale-down or scale-in an IMS network slice, etc. Management and organization element 640 may include the following functional blocks: NFV orchestrator, VNF manager, and Virtualized Infrastructure Manager (VIM). The NFV orchestrator is configured to instantiate new network services (NS) and virtual network function (VNF) packages, NS lifecycle management (e.g., instantiation, scale-out, scale-in, performance measurements, event correlation, and termination), global resource management, and validation and authorization of NFV Infrastructure (NFVI) resource requests. The VNF manager is configured to oversee life-cycle management of VNF instances, and to perform a coordination and adaptation role for configuration and event reporting between NFVI and a management system (e.g., E/NMS). VIM is configured to control and manage the NFVI compute, storage, and network resources.

Figure 7:
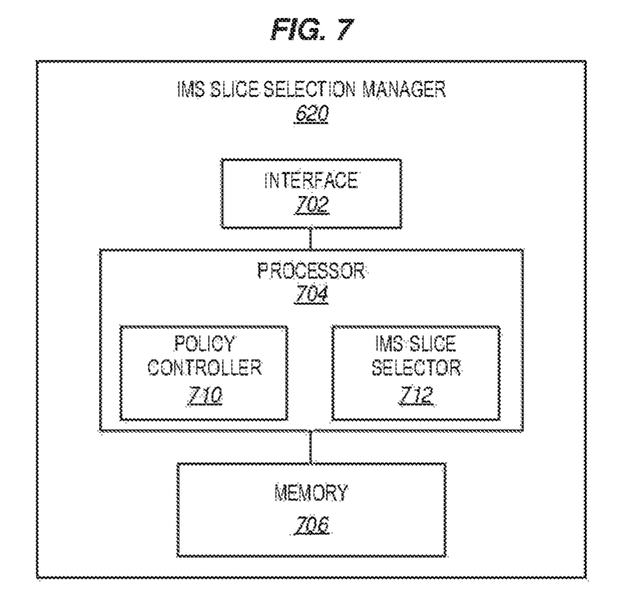
FIG. 7 is a block diagram of an IMS slice selection manager in an illustrative embodiment.

FIG. 7 is a block diagram of IMS slice selection manager 620 in an illustrative embodiment. IMS slice selection manager 620 includes an interface component 702, one or more processors 704, and a memory 706. Interface component 702 may comprise circuitry, logic, hardware, means, etc., that exchanges messages with other network elements or network functions. For example, interface component 702 may be configured to communicate with PCF 218 or IMS policy manager 630, such as over the N5 reference point. Interface component 702 may communicate with NSSF 213, with network functions within IMS network slices 602-604 (e.g., an S-CSCF, an application server, etc.). Processor 704 represents circuitry, logic, hardware, means, etc., that provides the functions of IMS slice selection manager 620. Memory 706 is a (non-transitory) computer readable storage medium (e.g., ROM or flash memory) or means for storing data, instructions, applications, etc., and is accessible by processor 704. IMS slice selection manager 620 may include various other components not specifically illustrated in FIG. 7.

Processor 704 may implement a policy controller 710 and an IMS slice selector 712. Policy controller 710 is configured to acquire an IMS slice selection policy for a UE from a local cache (e.g., operator-provisioned rules), from IMS policy manager 630, or from another server or database. Policy controller 710 may store the IMS slice selection policy for a configurable time period, such as in memory 706. IMS slice selector 712 is configured to select an IMS network slice for a UE or session based on the IMS slice selection policy and/or other information.

Figure 8:
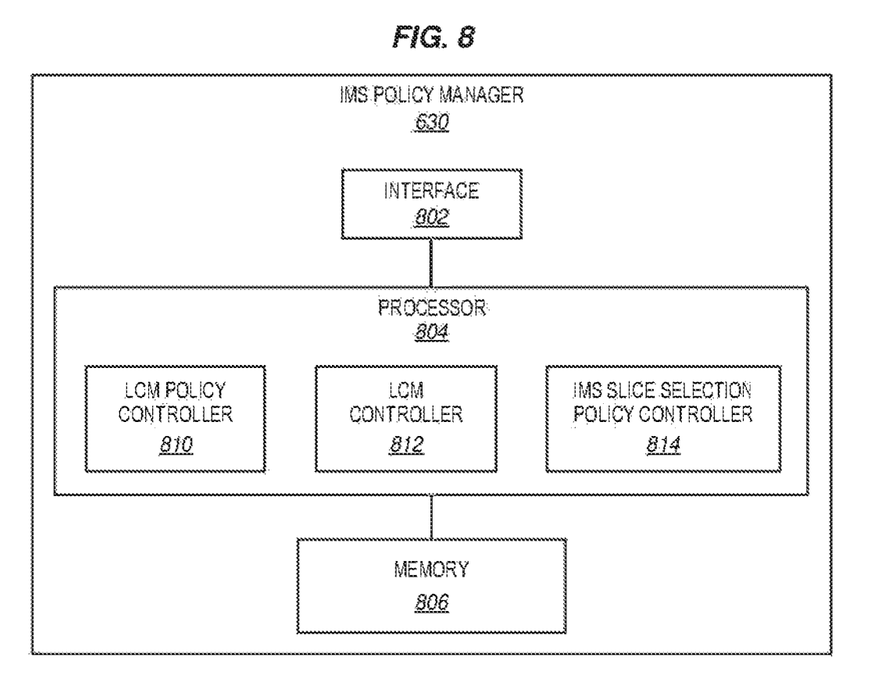
FIG. 8 is a block diagram of an IMS policy manager in an illustrative embodiment.

FIG. 8 is a block diagram of IMS policy manager 630 in an illustrative embodiment. IMS policy manager 630 includes an interface component 802, one or more processors 804, and a memory 806. Interface component 802 may comprise circuitry, logic, hardware, means, etc., that exchanges messages with other network elements or network functions. For example, interface component 802 may be configured to communicate with SBC 610 or IMS slice selection manager 620, such as over the N5 reference point. Interface component 802 may communicate with management and organization element 640 or other network functions. Processor 804 represents circuitry, logic, hardware, means, etc., that provides the functions of IMS policy manager 630. Memory 806 is a (non-transitory) computer readable storage medium or means for storing data, instructions, applications, etc., and is accessible by processor 804. IMS policy manager 630 may include various other components not specifically illustrated in FIG. 8.

Processor 804 may implement a Life Cycle Management (LCM) policy controller 810, an LCM controller 812, and an IMS slice selection policy controller 814. LCM policy controller 810 is configured to generate and/or modify an LCM policy for IMS network slices based on local provisioning and/or input from other network equipment, such as PCF 218, UDM 212, a charging system, etc. LCM refers to management of IMS network slices of an IMS network during the existence of the IMS network slices since inception. Generation and modification of the LCM policy may be triggered when local provisioning changes, upon receiving input from other network elements, etc. The LCM policy may comprise a set of rules defined for LCM of an IMS network, and each of the rules in the set may include LCM criteria and LCM actions. The LCM criteria may be any combination of network conditions, IMS subscriber type, network load, location of IMS users, etc. LCM actions may include creating a new IMS network slice, releasing an IMS network slice, upgrading an IMS network slice (i.e., scale-up, scale-out, scale-down, or scale-in), etc. When policy generation and modification are completed, LCM policy controller 810 is configured to download the LCM policy to LCM controller 812.

LCM controller 812 is configured to provide LCM for each of the IMS network slices 602-604 and IMS network 402 based on the LCM policy. LCM controller 812 may retrieve network conditions or other information regarding the LCM criteria, and monitor for a change in the network conditions or other information. When the state of the network conditions or other information match LCM criteria, LCM controller 812 may initiate the LCM actions mapped to the LCM criteria through management and organization element 640 to modify one or more of the IMS network slices or the configuration of IMS network 402 (e.g., create a new IMS network slice, update an existing IMS network slice, terminate an IMS network slice, etc.).

Responsive to modifying one or more IMS network slices, LCM controller 812 may report the modification to IMS slice selection policy controller 814 to update an IMS slice selection policy. LCM controller 812 may also report the modification to LCM policy controller 810 to update the LCM policy.

IMS slice selection policy controller 814 is configured to generate and/or modify an IMS slice selection policy based on network conditions, input from other network elements (e.g., PCF 218, UDM 212, a charging system, etc.), input from LCM controller 812, etc. The IMS slice selection policy includes a set of rules defined to select an IMS network slice from a plurality of IMS network slices for a UE or a session. Each of the rules in the set may include slice selection criteria and slice selection actions. The following parameters or their combination may be used as the slice selection criteria: calling party number, called party number, International Mobile Subscriber Identity (IMSI) or IMSI range, International Mobile Equipment Identity (IMEI), source node, Access Point Name (APN), IP address, application type, Time of Day, device location, or any other parameter detectable by SBC 610 or IMS slice selection manager 620. The slice selection actions may comprise identifying or providing an indicator or address of a selected IMS network slice, identifying or providing a list of selected IMS network slices with a priority or preference indication, etc. IMS slice selection policy controller 814 is configured to provide the IMS slice selection policy to SBC 610 and/or IMS slice selection manager 620.

Figure 9:
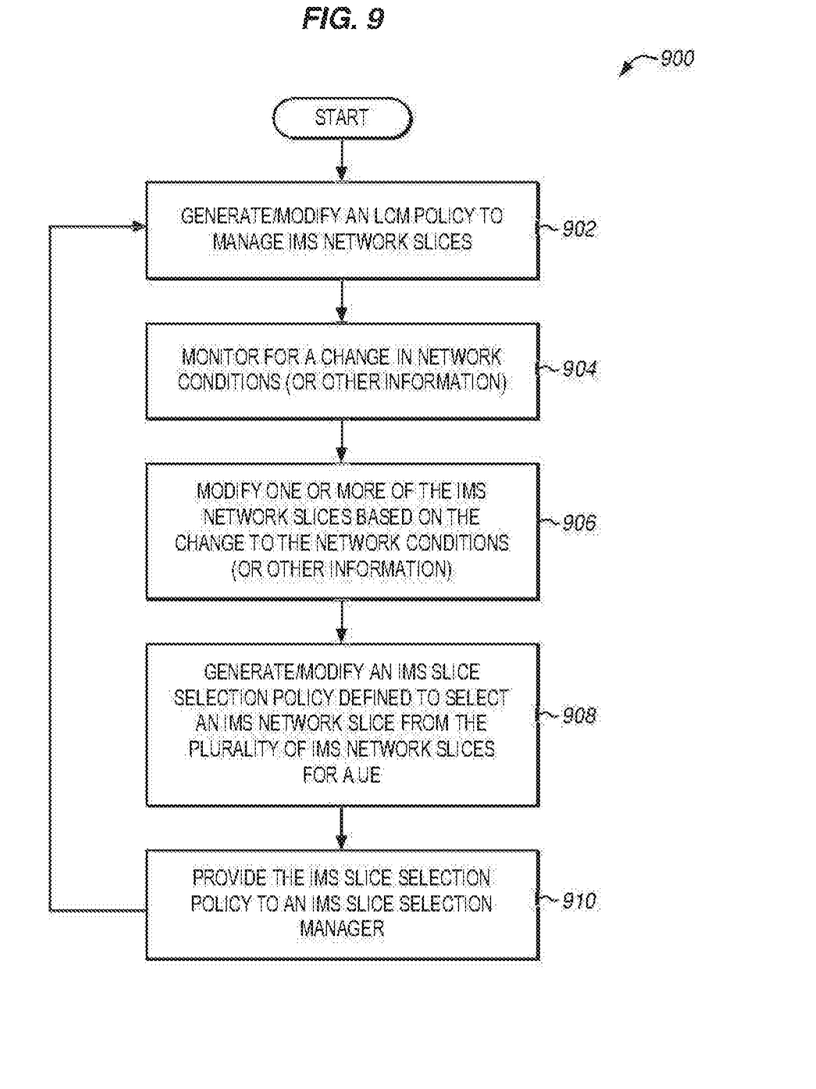
FIG. 9 is a flow chart illustrating a method of managing policies for IMS network slicing in an illustrative embodiment.

FIG. 9 is a flow chart illustrating a method 900 of managing policies for IMS network slicing in an illustrative embodiment. The steps of method 900 will be described with reference to IMS policy manager 630 in FIG. 8, but those skilled in the art will appreciate that method 900 may be performed in other devices or network functions. Also, the steps of the flow charts described herein are not all inclusive and may include other steps not shown, and the steps may be performed in an alternative order.

For method 900, it is assumed that a plurality of IMS network slices 602-604 is or will be instantiated on a shared physical network infrastructure as part of IMS network 402. IMS policy manager 630 generates or modifies an LCM policy to manage the IMS network slices 602-604 (step 902). As described above, the LCM policy may specify that a new IMS network slice is created, an IMS network slice is released, an existing IMS network slice is modified, etc., based on network conditions or other information. IMS policy manager 630 retrieves network conditions or other information regarding the LCM criteria of the LCM policy, and monitors for a change in the network conditions or other information regarding IMS network 402 (step 904). When the state of the network conditions or other information matches the LCM criteria, IMS policy manager 630 may initiate the LCM actions mapped to the LCM criteria. Thus, IMS policy manager 630 interacts with management and organization element 640 to modify one or more of the IMS network slices 602-604 or the configuration of IMS network 402 (e.g., create a new IMS network slice, update an existing IMS network slice, terminate an IMS network slice, etc.) based on the change to the network conditions or other information (step 906).

IMS policy manager 630 also generates or modifies an IMS slice selection policy, defined to select an IMS network slice from the plurality of IMS network slices 602-604 for a UE or a session, based on modification to one or more of the IMS network slices 602-604 or the configuration of IMS network 402 (step 908). IMS policy manager 630 provides the IMS slice selection policy to IMS slice selection manager 620 or SBC 610 through interface component 802 (step 910). For example, IMS policy manager 630 may transmit the IMS slice selection policy in a message sent over the N5 reference point. IMS policy manager 630 may provide the IMS slice selection policy to IMS slice selection manager 620 when the IMS slice selection policy is generated or modified, in response to receiving a request from IMS slice selection manager 620, upon expiration of a validity timer for the IMS slice selection policy, or responsive to another trigger.

Figure 10:
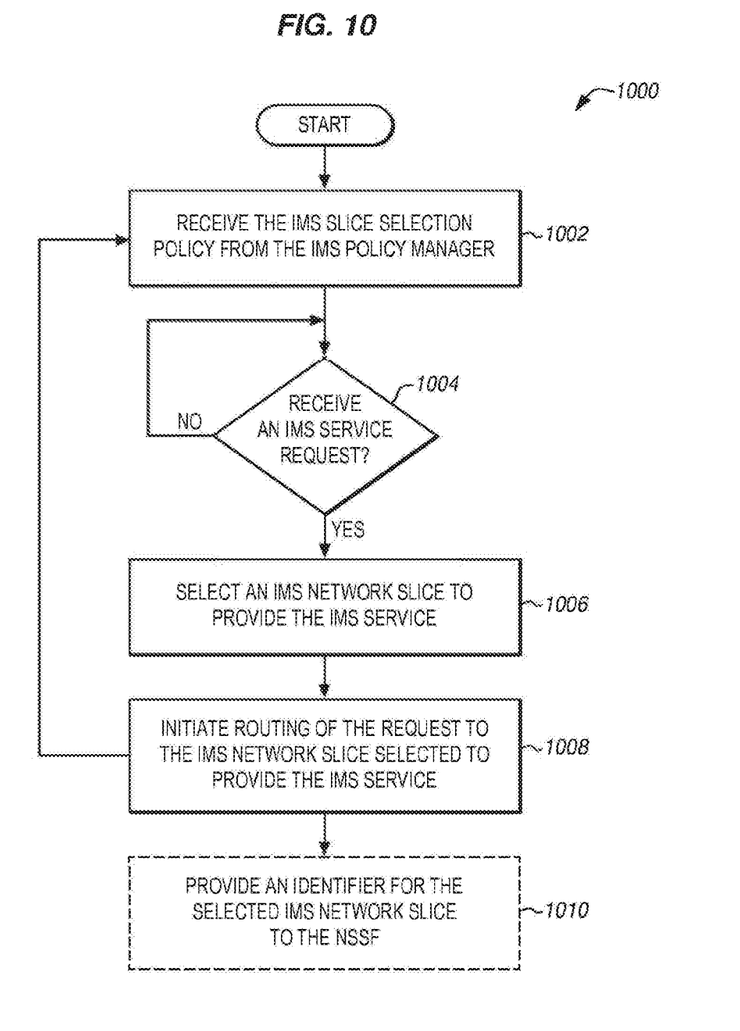
FIG. 10 is a flow chart illustrating a method of selecting an IMS network slice in an illustrative embodiment.

FIG. 10 is a flow chart illustrating a method 1000 of selecting an IMS network slice in an illustrative embodiment. The steps of method 1000 will be described with reference to IMS slice selection manager 620 in FIG. 7, but those skilled in the art will appreciate that method 1000 may be performed in other devices or network functions.

Policy controller 710 of IMS slice selection manager 620 receives the IMS slice selection policy from IMS policy manager 630 through interface component 702 (step 1002). Policy controller 710 may then store the IMS slice selection policy for a configurable time period, such as in memory 706. IMS slice selector 712 monitors for a request for an IMS service (step 1004). As described above, IMS slice selection manager 620 is implemented at the edge of IMS network 402 (i.e., at the edge of IMS network slices 602-604), and is the entry point into IMS network slices 602-604. Thus, any requests for IMS services from a next generation network (e.g., SMF 216) are visible to IMS slice selector 712. When a request for an IMS service is received through interface component 702, IMS slice selector 712 selects an IMS network slice to provide the IMS service based on the IMS slice selection policy (step 1006). For example, IMS slice selector 712 may parse the request to identify the calling party number, called party number, IMSI or IMEI, source node, APN, IP address, application type, Time of Day, device location, etc., and compare this or other information to the slice selection criteria of the IMS slice selection policy. When slice selection criteria is met, IMS slice selector 712 identifies an IMS network slice or a list of IMS network slices that are selected to provide the IMS service. IMS slice selector 712 then initiates routing of the request to the IMS network slice selected to provide the IMS service (step 1008). For instance, IMS slice selector 712 may identify an address for an S-CSCF in the selected IMS network slice, and cause the IMS service request to be routed to the S-CSCF. IMS slice selector 712 may route the IMS service request to the selected IMS network slice, or may instruct another element (e.g., SBC 610) to route the IMS service request to the selected IMS network slice. When a list of IMS network slices is identified, IMS slice selector 712 may initiate routing of the request to one of the IMS network slices in the list based on priority (e.g., the IMS network slice having the highest priority).

IMS slice selector 712 may optionally provide an identifier for the selected IMS network slice to NSSF 213 (step 1010). For example, IMS slice selector 712 may transmit a message directly to NSSF 213 over reference point 404 that includes the identifier for the selected IMS network slice. IMS slice selector 712 may transmit a message to NSSF 213 through AMF 214 or another network function of the core network that includes the identifier for the selected IMS network slice. NSSF 213 may then integrate the selected IMS network slice into the selection of a core network slice as described above in FIG. 3.

Figure 11:
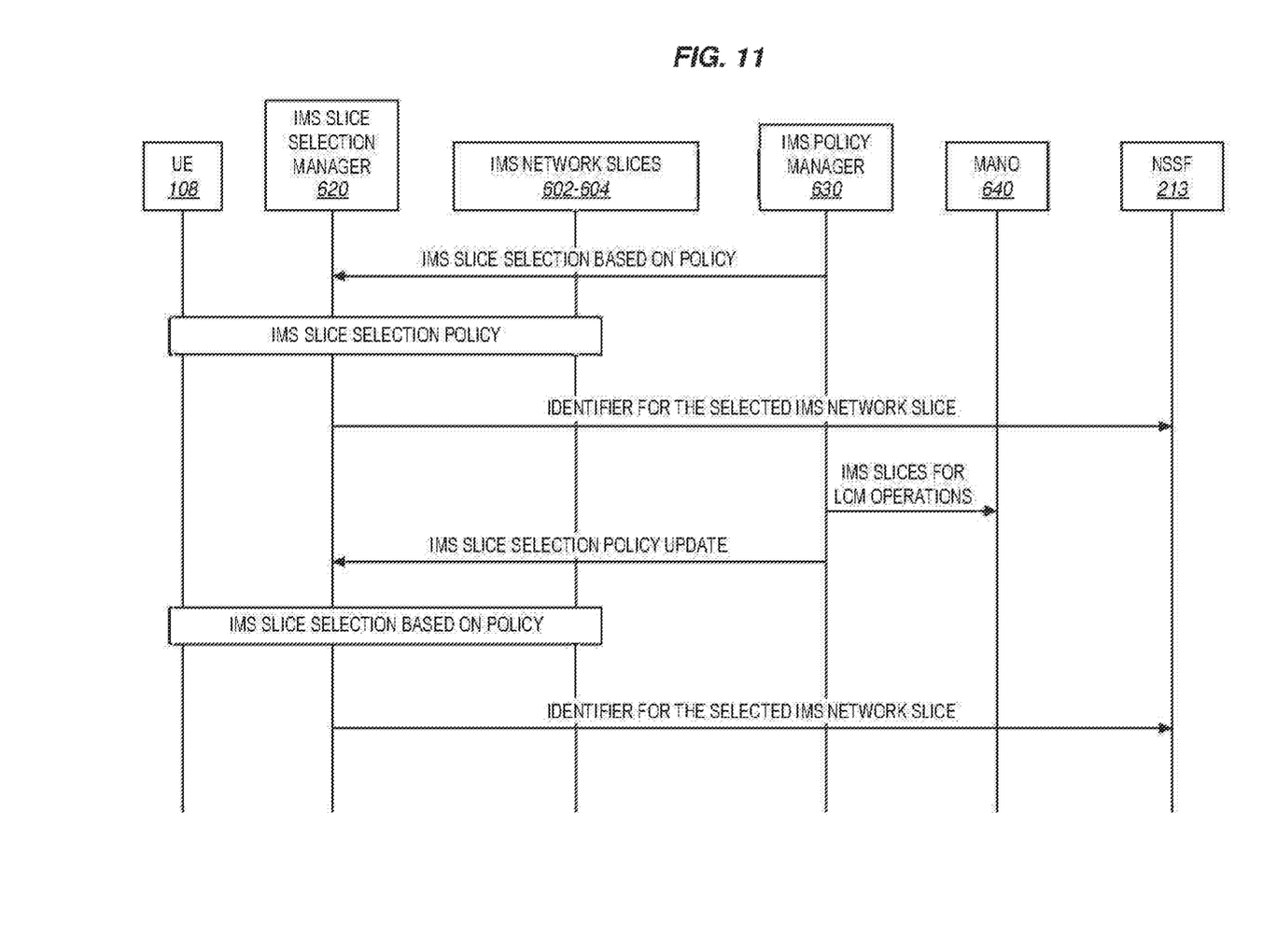
FIG. 11 is a flow diagram for IMS network slice management in an illustrative embodiment.

FIG. 11 is a flow diagram for IMS network slice management in an illustrative embodiment. IMS policy manager 630 generates an LCM policy and IMS slice selection policy, and sends the IMS slice selection policy to IMS slice selection manager 620. When an IMS service request is received, IMS slice selection manager 620 logic is triggered to select an IMS network slice for the IMS service based on the IMS slice selection policy. IMS slice selection manager 620 then routes the IMS service request to the selected IMS network slice. IMS slice selection manager 620 may also provide an identifier for the selected IMS network slice to NSSF 213.

IMS policy manager 630 monitors the network conditions based on the LCM policy. When a network condition changes, IMS policy manager 630 logic is triggered to interact with management and organization (MANO) element 640 to update the IMS network slice(s) 602-604. For example, if the workload of a new service (e.g., an AR communication) keeps increasing in one IMS network slice, then a new IMS network slice may be created by MANO element 640.

A change to the IMS network slice(s) may trigger an update to the IMS slice selection policy. Thus, IMS policy manager 630 may update the IMS slice selection policy, and send the IMS slice selection policy to IMS slice selection manager 620. IMS slice selection manager 620 will use the updated IMS slice selection policy to select IMS network slices 602-604 for future IMS service requests.

Any of the various elements or modules shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

As used in this application, the term "circuitry" may refer to one or more or all of the following:
  (a) hardware-only circuit implementations (such as implementations in only analog and/or digital circuitry);
  (b) combinations of hardware circuits and software, such as (as applicable):
    (i) a combination of analog and/or digital hardware circuit(s) with software/firmware; and
    (ii) any portions of hardware processor(s) with software (including digital signal processor(s)), software, and memory(ies) that work together to cause an apparatus, such as a mobile phone or server, to perform various functions); and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Although specific embodiments were described herein, the scope of the disclosure is not limited to those specific embodiments. The scope of the disclosure is defined by the following claims and any equivalents thereof.

What is claimed is:

1. An Internet Protocol (IP) Multimedia Subsystem (IMS) slice selection manager configured for implementation at an edge of a plurality of IMS network slices of an IMS network, the IMS slice selection manager comprising:
   one or more processors; and
   a memory storing instructions;
   the one or more processors, configured to access the instructions, to:
      receive an IMS slice selection policy that is at least based on input from a unified data management function that is configured to store at least one of the following data: subscription, policy, and session-related context data;
      receive an IMS service request for an IMS service;
      select an IMS network slice from the plurality of IMS network slices to provide the IMS service based on the IMS slice selection policy; and
      initiate routing of the IMS service request to the IMS network slice selected to provide the IMS service.

2. The IMS slice selection manager of claim 1, wherein:
   the IMS slice selection manager is implemented at a session border controller.

3. The IMS slice selection manager of claim 1, the one or more processors, configured to access the instructions, to:
   provide an identifier for the IMS network slice selected to provide the IMS service to a Network Slice Selection Function (NSSF) of a control plane of a next generation network.

4. The IMS slice selection manager of claim 3, further comprising:
   an interface component configured to directly communicate with the NSSF over a reference point.

5. The IMS slice selection manager of claim 1, the one or more processors, configured to access the instructions, to:
   implement an IMS policy manager configured to:
      monitor for a change in network conditions;
      modify at least one of the IMS network slices based on the change to the network conditions;
      modify the IMS slice selection policy based on modification of the at least one of the IMS network slices; and
      provide the IMS slice selection policy to the IMS slice selection manager.

6. The IMS slice selection manager of claim 5, wherein:
   the IMS policy manager is configured to interact with a management and organization element to modify the at least one of the IMS network slices.

7. The IMS slice selection manager of claim 5, wherein:
   the IMS policy manager is implemented in a Policy Control Function of a control plane of a next generation network.

8. A method of performing Internet Protocol (IP) Multimedia Subsystem (IMS) slice selection, the method comprising:
   receiving, at an IMS slice selection manager implemented at an edge of a plurality of IMS network slices of an IMS network, an IMS slice selection policy that is at least based on input from a unified data management function that is configured to store at least one of the following data: subscription, policy, and session-related context data;
   receiving, at the IMS slice selection manager, an IMS service request for an IMS service;
   selecting, at the IMS slice selection manager, an IMS network slice from the plurality of IMS network slices to provide the IMS service based on the IMS slice selection policy; and
   initiating routing of the IMS service request to the IMS network slice selected to provide the IMS service.

9. The method of claim 8, further comprising:
providing an identifier for the IMS network slice selected to provide the IMS service to a Network Slice Selection Function (NSSF) of a control plane of a next generation network.

10. The method of claim 8, further comprising:
monitoring, at an IMS policy manager, for a change in network conditions;
modifying at least one of the IMS network slices based on the change to the network conditions;
modifying the IMS slice selection policy at the IMS policy manager based on modification of the at least one of the IMS network slices; and
providing the IMS slice selection policy to the IMS slice selection manager.

11. A non-transitory computer readable medium embodying programmed instructions executed by one or more processors, wherein the instructions direct the one or more processors to implement:
   an Internet Protocol (IP) Multimedia Subsystem (IMS) slice selection manager at an edge of a plurality of IMS network slices of an IMS network;
   wherein the IMS slice selection manager is configured to:
      receive an IMS slice selection policy that is at least based on input from a unified data management function that is configured to store at least one of the following data, subscription, policy, and session-related context data;
      receive an IMS service request for an IMS service;
      select an IMS network slice from the plurality of IMS network slices to provide the IMS service based on the IMS slice selection policy; and
      initiate routing of the IMS service request to the IMS network slice selected to provide the IMS service.

12. The non-transitory computer readable medium of claim 11, wherein:
   the IMS slice selection manager is implemented at a session border controller.

13. The non-transitory computer readable medium of claim 11, wherein the instructions direct the one or more processors to implement:

an IMS policy manager configured to:
- monitor for a change in network conditions;
- modify at least one of the IMS network slices based on the change to the network conditions;
- modify the IMS slice selection policy based on modification of the at least one of the IMS network slices; and
- provide the IMS slice selection policy to the IMS slice selection manager.

14. The non-transitory computer readable medium of claim 11, wherein:
the IMS slice selection manager is configured to provide an identifier for the IMS network slice selected to provide the IMS service to a Network Slice Selection Function (NSSF) of a control plane of a next generation network.

15. The non-transitory computer readable medium of claim 14, wherein:
the IMS slice selection manager is configured to directly communicate with the NS SF over a reference point.

* * * * *

UNITED STATES PATENT AND TRADEMARK OFFICE
CERTIFICATE OF CORRECTION

| | |
|---|---|
| PATENT NO. | : 12,047,423 B2 |
| APPLICATION NO. | : 16/982970 |
| DATED | : July 23, 2024 |
| INVENTOR(S) | : Yigang Cai and Laurence Wang |

It is certified that error appears in the above-identified patent and that said Letters Patent is hereby corrected as shown below:

In the Claims

In Column 14, Line 53, Claim 11, delete "data," and insert -- data: --.
In Column 15, Line 20, Claim 15, delete "NS SF" and insert -- NSSF --.

Signed and Sealed this
Twelfth Day of November, 2024

Katherine Kelly Vidal
*Director of the United States Patent and Trademark Office*